United States Patent [19]
Bryk et al.

[11] 3,790,366
[45] Feb. 5, 1974

[54] METHOD OF FLASH SMELTING SULFIDE ORES
[75] Inventors: Petri B. Bryk, Helsinki; Jorma B. Honkasalo, Westend; Rolf E. Malmstrom; Simo A. I. Makipirtti, both of Pori; Toivo A. Toivanen, Harjavalta; Olavi A. Aaltonen, Pori, all of Finland
[73] Assignee: Outokumpu Oy, Ottokumpu, Finland
[22] Filed: Jan. 13, 1970
[21] Appl. No.: 2,471

[30] Foreign Application Priority Data
Jan. 14, 1969 Finland.................................. 104/69

[52] U.S. Cl.................................. 75/23, 75/7, 75/74, 75/110, 423/571
[51] Int. Cl.... C22b 15/00, C22b 1/02, C22b 15/04
[58] Field of Search......... 75/23, 24, 25, 26, 34, 21, 75/72, 73, 6, 7, 9; 23/224

[56] References Cited
UNITED STATES PATENTS

| | | | |
|---|---|---|---|
| 2,209,331 | 7/1940 | Haglund | 75/9 |
| 2,086,201 | 7/1937 | Zeisberg | 75/9 |
| 3,386,815 | 6/1968 | Gorling | 75/9 |
| 2,984,561 | 5/1961 | Amdur | 75/9 |
| 2,090,386 | 8/1937 | Ferguson | 75/9 |
| 2,503,555 | 4/1950 | Lyrken | 75/9 |
| 2,746,859 | 5/1956 | McGouley | 75/1 |
| 3,306,708 | 2/1967 | Bryk | 423/571 |
| 2,219,411 | 10/1940 | Carlsson | 75/23 |
| 2,868,635 | 1/1959 | Aannerud | 75/23 |

Primary Examiner—L. Dewayne Rutledge
Assistant Examiner—Peter D. Rosenberg
Attorney, Agent, or Firm—Albert M. Parker; Harold Haidt; Lorimer P. Brooks; G. Thomas Delahunty; Alfred L. Haffner, Jr.; Charles G. Mueller

[57] ABSTRACT

A fine-grained concentrate of sulphide ore is suspended by a special dispenser into which a heated downward flow of air, air enriched with oxygen or oxygen containing gas in a vertical reaction shaft of a furnace to oxidize the non-oxidic metal compounds in the concentrate. The gases and the flue dust are separated from the solids which form a smelt on the bottom of the furnace consisting of a matte and a slag on the matte. The partial pressure of sulphur in the gases obtained from the oxidizing smelting carried out in the reaction shaft is increased and/or the partial pressure of oxygen is decreased, in which case the metal oxides contained in the flying dust are converted into corresponding sulphides and most of the iron contained in the slag retains the valence of 2.

9 Claims, 2 Drawing Figures

METHOD OF FLASH SMELTING SULFIDE ORES

BACKGROUND OF THE INVENTION

1. Field of the Invention

The invention relates to a method to be used in connection with flash smelting of sulphide ores.

2. Description of the Prior Art

In the flash smelting method of copper ores, fine-grained copper concentrate is suspended, together with air heated to a high temperature or gas containing oxygen or air enriched with oxygen, by a special disperser, while moving downwards in a vertical shaft, at which time the non-oxidic metal compounds contained in the concentrate become oxidized.

Due to the heat content or sufficient oxygen concentration of the combustion air, so high a temperature is obtained in the shaft by using the reaction heat that the solid materials melt.

The gases and solids are separated from each other, and a melt separates on the bottom of the so-called separation section of the furnace. The surface layer of the melt is formed by slag and the second layer by sulphide matte and the bottom layer of metal. At times slag and matte are removed from the furnace.

The gases and the flying dust following them escape from the furnace space along the so-called rising tube into, for example, the waste heat boiler, where their temperature is lowered, after which the flying dust is separated from the gases in an electric filter.

The recovered oxidized or sulphated flying dust is returned to the smelting process, where it forms a so-called circulating load and takes its melting heat from the burning components of the actual concentrate, thus decreasing the smelting capacity of the shaft.

The copper content of the slag formed in the smelting of copper ores is of great importance for the economy of the smelting process. The effect of the copper content of the matte formed in the smelting process on the copper content of the slag can be clearly seen as in direct dependence; the more copper there is in the matte, the higher copper content in the slag as well.

One alternative is to carry out the smelting in such a manner that the copper content of the matte stays low, in which case the copper content of the slag is also low.

However, the result of this is that a great amount of slag is left to be treated in the converter, which again gives a great circulating slag load to the furnace.

When copper matte with a higher copper content has been desired in flash smelting, the slag has been treated separately, by keeping it molten, for example, in an electric furnace and by adding, for example, pyrite to sulphidize the copper.

In this case, the slag may have originally contained as much as 1–4 per cent copper, and the aim is to bring the copper content to 0.4 per cent or less.

In the so-called Worcran smelting method, shown in U.S. Pat. Nos. 3,326,671 and 3,463,422 and developed by Austrailian H.K. Worner, a reverberatory-type furnace equipped with a special bottom form is used for the smelting of copper ores. The concentrate is fed to the middle of the furnace, and matte with a copper content of more than 80 percent, or copper, is removed at one end of the furnace, the furnace atmosphere being oxidizing. At the other end of the furnace, pyrite is fed onto the surface of the slag and the necessary heat is given by an oil burner with a reducing flame. The gases escaping from the furnace will contain some 9–12 percent $SO_2$, as well as oxygen and nitrogen.

Experiments have also been made regarding the effect of several metal sulphides on recovering copper in the form of a sulphide from the slag. According to these experiments, the most effective sulphidizer is calcium sulphide.

It has been noted that iron with a valence of 3 is formed in the smelting process of copper ores. This iron, or magnetite as such, and when separated, greatly increases the viscosity of the slag and thereby slows down the separation of possibly sulphidized copper as matte from the slag. Therefore attempts have been made to reduce the magnetite by different methods, by adding coal to the surface of the slag and/or adding also pieces of cast iron containing carbon into the furnace. Furthermore, if the magnetite content is sufficiently high it tends to separate in a solid form from the melt or semi-melt (dusts etc.) at the used temperatures and thus form growths at certain points.

SUMMARY OF THE INVENTION

According to the invention the ratio of the partial pressure of sulphur vapor to the partial pressure of oxygen is increased in the gases obtained from the oxidizing smelting in the vertical reaction shaft of a furnace to convert the metal oxides contained in the flue dust following the gases into corresponding metal sulphides and to retain most of the iron in the slag in a bivalent state.

The inconveniences and difficulties caused by the prior smelting methods are eliminated when sulphide ores are smelted in accordance with the present invention. Furthermore, it is possible to control the process better than before, to increase the capacity of the apparatus and to decrease the amount of metal lost in the slag.

FIG. 1 is a schematic view in cross section of apparatus suitable for performing the method of the invention FIG. 2 is a top view of the apparatus of FIG. 1.

DESCRIPTION OF THE PREFERRED EMBODIMENTS

Figure 1:
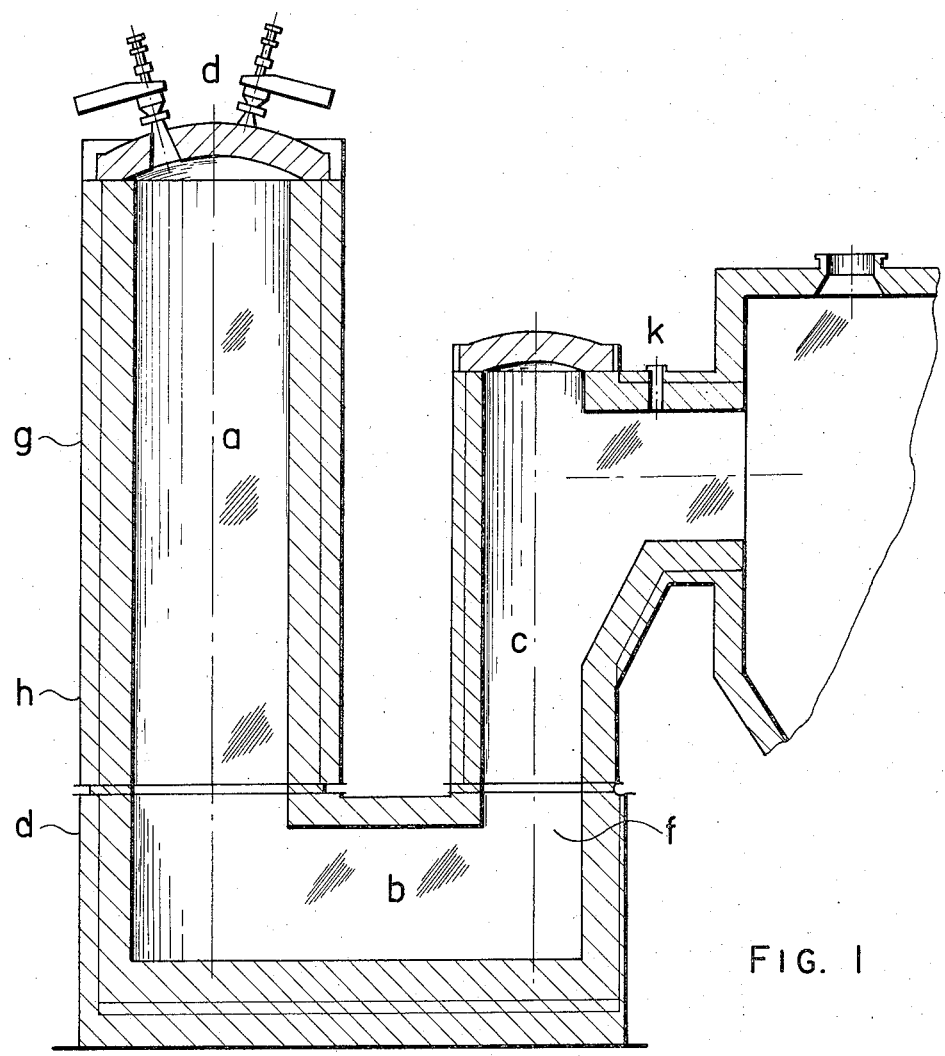
Figure 2:
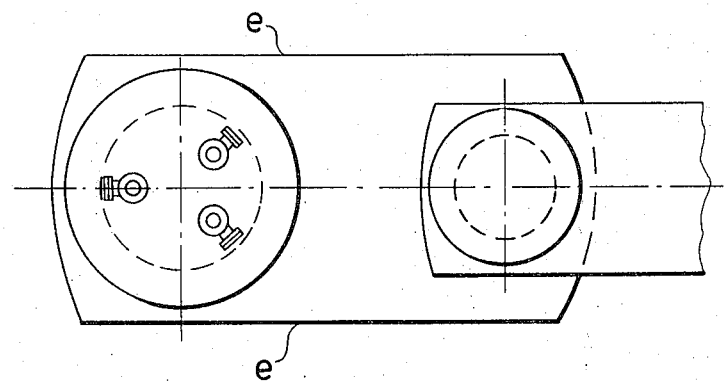

The gases emerging from the reaction shaft are treated reducingly enough with suitable materials so that the oxygen pressure of the gases is lowered and respectively so much elemental sulphur is reduced from the sulphur dioxide that the pressure of sulphur vapor in the furnace atmosphere is sufficient to cause the sulphidizing of both the metal oxides contained in the flying dust (Cu, Ni, Co, Zn, Pb, etc.) and the copper contained in the slag. In other words, the pressure of the sulphur vapor is as high or higher than the vapor pressure of the sulphur in the sulphide compounds of metal at the temperature in question, in which case the said sulphides are, under these conditions, stable, and copper, for example, can be separated from the slag into the matte in the form of a sulphide.

In practice this takes place in the following manner: so much fuel, sufficiently dispersed, for example, carbon dust, liquid or gaseous hydrocarbons, saw dust, etc., is added to the gases emerging from the reaction shaft that the reduction mentioned above is obtained in the gases; if needed, fuel is also added for the purpose of producing heat.

The pressure of the sulphur vapor of the furnace gases can in principle be increased also by feeding elemental sulphur into the gases emerging from the reaction shaft; at the temperatures in question this sulphur immediately vaporizes creating the desired atmosphere. Most of the time it may be, however, most advantageous to create the sulphur vapor atmosphere with the help of some fuel from the sulphur compounds contained in the furnace gases themselves.

The reduction of sulphur dioxide must be carried out at least so far that the sulphur pressure of the furnace atmosphere is sufficient to carry out the desired sulphidizing. This can be easily regulated by regulating the amount of fuel.

With the method according to the present invention, by sufficiently increasing the reduction, most of the sulphur contained in the sulphur dioxide can also be converted into elemental sulphur and recovered by cooling the gases.

In certain cases this is most advantageous because the recovery and treatment of elemental sulphur often gives a remarkably more economic result than the manufacture of sulphuric acid and the devices required for it.

When the method according to the present invention is used, a remarkable advantage is also gained in regard to the factors having an effect on the pollution of the open air in connection with the treatment of the exhaust gases.

The flying dust, which has so far been ineffective material that loads the smelting in the flash smelting process, gives a considerable amount of heat in the form of sulphides and thus increases the smelting capacity of the shaft.

When the metals of the flying dust are in the form of sulphides, the conventional flotation method of sulphide minerals can be used to separate them, which would not be possile in the case of respective metal oxides.

By appropriately regulating the degree of reduction of the reaction gases emerging from the shaft, the final $SO_2$ content of the gas can also be regulated, for example, keeping an eye on the optimal $SO_2$ content required by the devices used in the process of manufacturing sulphuric acid. This can be done, for example, when the capacity of the manufacturing devices of sulphuric acid is not sufficient for the treatment of the entire amount of gases obtained from the smelting process. In this case the sulphur content of the extra $SO_2$ can be recovered in the form of elemental sulphur in the method according to the present invention.

Because the copper content of the slag can be maintained sufficiently low with the reduction of the furnace gases, the smelting of copper ore can be carried out in the reaction shaft in an atmosphere more oxidizing than before. Thereby is created a matte richer in copper without simultaneously increasing the losses of copper in the slag. Neither can magnetite, which has so far prevented these attempts, cause any difficulties.

By carrying out the flash smelting of copper concentrate, with the method according to the present invention, in a shaft in a more oxidizing atmosphere than ordinarily used, in which case a matte rich in copper (> 80 percent) or a raw metal is formed, the amount of iron blown into a slag in the converter and also of the slag formed in it can be greatly decreased, thus essentially decreasing losses of copper occurring through it and possibly the amount of converter slag to be treated separately in order to recover copper.

Under suitable conditions it is possible, with flash smelting to carry out the oxidation in the shaft so far that a melt containing mainly metallic copper and/or possibly some $Cu_2S$ (white metal) is formed on the bottom of the furnace, and on the top of this melt the actual layer of slag, the atmosphere of which is, according to the present invention, sufficiently reducing to keep the copper content of the slag as low as desired.

The result of this is that most of the conventional converter work can be left out, and thus one very inconvenient stage of work can be decreased with the method according to the present invention, which is a very remarkable advantage both economically and technically.

The smelting carried out in the shaft need not necessarily be a so-called autogenic flash smelting, but fuel can also be fed into the shaft to obtain the smelting temperature. This is much closer to the conventional smelting of copper ores, but the method according to the present invention can as well be applied to a case like this.

The construction of a flash smelting furnace according to U.S. Pat. No. 2,506,551 has proven most advantageous in the application of the method according to the present invention because in this furnace the gaseous atmospheres of the vertical reaction shaft and the horizontal separation section are separate from each other, and a continuous flow of gas in the same direction effectively maintains this situation.

The sulphur-containing atmosphere crreated with the method according to the present invention above the melt has proven most advantageous in the flash smelting process of copper ores. The following examples give the balance of a flash smelting carried out in the conventional manner and the balances of smeltings including the reduction in accordance with this invention.

A furnace system like the one presented in FIG. (1) was used in the test smeltings. The diameter of the vertical reaction shaft (a) was 1.20 m and height 6.5 m. The lower section of the reaction shaft was connected with the separation, or lower, furnace (b), the dimensions of which were the following: width 1.20 m, height 1.00 m and length 3.80 m. Opposite the reaction shaft, on the top of the lower furnace, there was a vertical shaft uptake (c) for removing the exhaust gases. The dimensions of this shaft were the following: diameter 0.76 m and height 4.70 m.

In order to cover the relatively great losses of heat due to the small scale of the furnace, butane was used as additional fuel in the experiments (its composition was the following: 17.24 percent of weight H and 82.76 percent of weight C). The additional fuel was fed in a raw state partly through the cover of the reaction shaft and partly from below the shaft through the wall of the lower furnace (FIG. (1), d).

Butane was also used to create the reducing conditions in the lower furnace (b) and the uptake in the test series described here. It was fed raw into the furnace at the points (e) and (f) indicated in FIG. (1).

The concentrate feed, slag materials and combustion air were fed through the cover of the reaction shaft into the reaction space with the help of specially-constructed suspension dispersers.

Melt products — matte and slag phase — were removed from the furnace periodically after sufficient seperation periods and cast into chill molds or granulated with the help of sprays of water.

The gases emerging from the furnace and the flying dust following them were led through the rising tube into the waste heat boiler, were their temperature (1250°-1300°C) was lowered to 400°C. After this, the flying dust was removed from the gases with electric filters.

For a partial recovery of sulphur, the gases were led from the electric filters into a condensation boiler — 150°C — or gases reduced, for example, in the uptake into the ratio — vol-% —$(H_2+H_2S+CO+COS)/2SO_2=1$ in a conventional manner to a catalytic circuit and condensers — double catalysis: 400°C and 210°C.

The proceeding of the experiments was observed by carefully measuring and analyzing the amounts of material fed into the furnaces and removed from them.

The changes in the matte and slag content of the lower furnace were observed by taking samples from the melt, from points between the bottom and surface, and at some 500 mm from each other, at regular intervals for a chemical analysis, microsonde and other X-ray analyzers.

The composition of the gas phase was measured — FIG. (1) — with a gas chromatographic analyzer at points $(g)$ and $(h)$ of the reaction shaft and at point $(k)$ of the uptake.

The samples of solid and molten materials in the reaction shaft and the uptake were taken at the same points as the gas samples.

The temperatures of the system were continuously automatically measured and in addition at the points where samples were taken at the times they were taken.

During the testing periods the reaction shaft was operated so that the gas temperature of measuring point $(h)$ of the shaft — FIG. (1) — was 1300° ± 10°C.

value $= F(P_{O_2}) = 4.693 \times 10^7 \times P_{O_2} 0.908$; in which $P_{O_2}$ is the oxygen pressure in atmospheres.

In the basic operation as well as in the test operations the mineral composition of the used concentrate was — weight-% —: 52.63 $CuFeS_2$; 22.56 $Fe_{12}S_{13}$; 11.57 $FeS_2$; 3.02 $Zn_{11}Fe_2S_{13}$; 0.32 CoS; 0.19 NiS; 7.16 $SiO_2$; 0.29 CaO; 1.50 MgO, and 0.26 $Al_2O_3$, and its elemental composition respectively — weight-% — 18.22 Cu; 35.58 Fe; 1.74 Zn; 0.21 Co; 0.12 Ni, and 33.99 S. The humidity of the used combustion air was 0.75 vol-%.

In the basic operation it was also defined when the sulphidizing of the flying dusts as a function of the copper content of the matte was to be started in the flash smelting process.

EXAMPLE I-1

Conventional Smelting method

All the tests series except the last (III-1) are based on the same conditions of the reaction shaft — amounts fed, temperatures, cooling, combustion technology, etc.

The amount of conentrate feed was 503 kg/h. The amount of butane in the reaction shaft was 23.2 kg/h. The combustion air for the concentrate and the butane, 965 $Nm^3$, had been pre-heated to the temperature of 500°C.

In the example I-1, the amount of heating fuel in the lower furnace was 42.7 kg/h. The purpose was to regulate the combustion air of the lower furnace so that the oxygen pressure of the gas phase would settle at the same as that of the gases emerging from the reaction shaft. The amount of air used in the experiment was 504 $Nm^3$.

The length of the testing periods was usually some 5 days.

The material balance obtained with the conventional smelting method, and an analysis of its main components is seen in Table 1.

Table 1

| Balance component | Amounts and analyses of main components Amounts of material - kg | | | | | |
|---|---|---|---|---|---|---|
| | Sum | Cu | Fe | S | O | $SiO_2$ |
| In | | | | | | |
| Cu concentrate | 66007 | 12028 | 23485 | 22434 | — | 4725 |
| Sand | 11738 | — | 109 | — | 47 | 10336 |
| Total (1) | 77745 | 12028 | 23594 | 22434 | 47 | 15061 |
| Out | | | | | | |
| Matte | 10857 | 8317 | 217 | 2123 | 30 | 16 |
| Slag | 43485 | 1456 | 20006 | 115 | 6542 | 11929 |
| Flying dust | 12279 | 2255 | 3359 | 408 | 1518 | 3131 |
| Total (2) | 66621 | 12028 | 23636 | 2646 | 8090 | 15076 |
| Difference (1)-(2) | | 0 | −42 | 19788 | −8043 | −15 |
| Analyses - weight-%- | | | | | | |
| Concentrate | | 18.22 | 35.58 | 33.99 | — | 7.16 |
| Sand | | — | 0.93 | — | 0.40 | 88.06 |
| Matte | | 76.60 | 2.50 | 19.55 | 0.28 | 0.15 |
| Slag | | 3.35 | 46.01 | 0.27 | 15.05 | 27.43 |
| Flying dust | | 18.37 | 27.36 | 3.32 | 12.37 | 25.50 |

For experiments to be carried out with rich copper matte, the specific curve of the testing shaft with three burners in regard to oxidation of iron was measured while using different copper contents of matte. The specific curve of the shaft obtained at point $(h)$ and at the temperature of 1300° ± 10°C was $$Cu-\%/76.66 = F(P_{O_2})/[1 + F(P_{O_2})],$$

in which Cu-% is the copper content of the matte in weight percentages. Function $F(P_{O_2})$ has the The analyses of the additional components, the gas phase balances and analyses of the reaction shaft and the lower furnace, and the heat balances of the processes are given in Appendixes I, II and III.

According to Appendix II the oxygen pressure of the gas phase at measuring point $(h)$ of the reaction shaft in the test operation of this example is $1.17 \times 10^{-7}$ atm. (in the matte 76.6 % Cu). The sulphur content of the flying dust is only 3.32 %, so that there is obvious danger of the uptake getting clogged. In the case of leakages of air the waste heat boiler would be easily polluted because of sulphate-oxide clinkers, and the dust to be returned in the process would become even lower in fuel value than before.

The slag formed in the process was ordinary Fe olivine slag (in which Zn olivine appeared as an independent mineral in a consolidated state). No crystallized magnetite appeared in the molten slag because the amount of ($Fe^{+3}$) iron with a valence of 3 was sufficiently low, that is, 9.83 %. The copper content of the slag was considerable (3.35%). According to the X-Ray surface analyzer the copper contained in the slag was in the form of metallic copper, $Cu_2O$ and sulphide matte. Because the process was operated with great amounts of dust in order to study the flying dusts, the distribution of the side components does not correspond to the great scale. The component distribution in relation to slag was the following — weight-% of the feed —: 79.7 Co; 34.2 Ni; 41.5 Zn; 2.9 Ag; and 0.2 Au. The sulphide matte contained some 5 percent metal phase. The composition of the phase was — weight-% —; 96.7 Cu; 0.18 Fe; 0.20 Zn; 0.80 Ni; 0.70 Co; and 1.50 S.

EXAMPLE II-1

Partial reduction and sulphidizing in the uptake

The balance of materials in this test operation was exactly the same in the reaction shaft and the lower furnace (b) as in the previous example. However, when the specific curve of the reaction shaft was determined, it was noted that the growths of the material in the uptake did not appear if the oxygen pressure of the gas phase at measuring point (h) — FIG. 1 — ($P_O = 5 \times 10^{-9}$ atm. (1300°C).

Because of the said FIGURE, 16.9 kg of butane per hour was fed to feeding point (f) of the uptake for the reduction.

Because of the endothermic sulphidizing reactions of the flying dusts the temperature of the gas phase in the uptake decreased to 1250°± 10°C. Simultaneously the amount of sulphur in the flying dust increased from 3.32 to 18.29 percent S, the amount of oxygen respectively decreasing (12.4 – 2.7 percent O).

The amount and analyses of the flying dust and the gas phase balance with its analysis and the heat balance are given in Appendixes I, II and III. The oxygen pressure of the gas phase was, at the temperature of 1250°C, $P_{O_2} = 1.82 \times 10^{-9}$, and $P_{S_2} = 4.18 \times 10^{-3}$ atm. The fuel value of the flying dust rose simultaneously — the basis of the balance being the oxidation degree FeO, $Cu_2O$, ZnO — from (298°K) — $\Delta H = -32$ Kcal/kg to - $\Delta H = +585$ Kcal/kg.

EXAMPLE II-2

Partial reduction and sulphidizing in the lower furnace and the uptake

The test operation differs from the previous one (II-1) in the respect that the fuel for the reduction and the sulphidizing is fed behind the reaction shaft at point (e) — FIG. (1). The task is to observe to what extent the gas phase composition used in the uptake in the previous test effects the matte and slag phases at the used temperatures. In order to create an oxygen pressure of $P_{O_2} = 1.8 \times 10^{-9}$ atm. at the temperature of 1250°C, 19.29 kg of butane per hour was used as additional fuel in the gas phase in comparison to a conventional smelting method, in which case the total amount of fuel rose to 85.19 kg/h. The figures and analyses of materials of the obtained new smelting balance are given in Appendixes I, II and III.

No essential changes have taken place in the compositions of the flying dust and matte. The partial reduction of the slag has slightly increased the amount of matte. The decrease in the amount of flying dust is mainly due to the growth of the particle size of the used sand, and a corresponding decrease in the amount of sand feed and the amount of dust resulting from it.

A considerable change take places in the slag, in which the proportionate amount of 3-valence iron decreases to some 4.5 percent, having been some 9.8 percent in the previous cases. The sulphur content of the slag increases slightly, but the copper content decreases considerably, to the proportionate amount of 0.5 percent Cu, having been 3.4 percent in the previous tests. The lengthening of the delay period from the used four hours did not lessen the copper content of the slag with the used degree of reduction of the gas. Metallic copper and copper matte was observed with a microsonde in minimal quantities only.

The distribution of the side component metals in the process did not essentially change in comparison with the previous figures.

EXAMPLE II-3

Partial reduction and sulphidizing in the lower furnace and the rising tube

This test operation differs from the previous one (II-2) in that more reduction butane, an amount of 13 kg/h, is fed to the uptake — point (f) — in order to lower the oxygen pressure of the gas phase and to respectively increase its sulphur pressure.

Because of the increase of the sulphur pressure of the gas phase a complete sulphidizing takes place in the flying dust. The new amount and composition of the flying dust, the gas phase corresponding to the process, and the heat balances are given in Appendixes I, II, and III.

The sulphur and oxygen pressures of the gas phase settled in the uptake at a temperature of 1250°C at $P_{S_2} = 7.93 \times 10^{-3}$ atm. and $P_{O_2} = 9.08 \times 10^{-10}$ atm. The gas phase was directed through a catalytic circuit. Part of the sulphur, that is, 60 percent of the feed of the gas phase, was recovered in the form of elemental sulphur. According to Table 2, the amount of sulphur components, mainly $SO_2$, carried by the exhaust gases was 2.24 percent.

EXAMPLES II-4 AND II-5.

Partial reduction and sulphidizing in the lower furnace (b) reduction of gases in the uptake to a reduction ratio completely corresponding to the sulphur catalysis.

Examples II-4 and II-5 differ from the previous example II-3 in that so much fuel is now added to the uptake that the reduction ratio to be catalyzed, namely, $(H_2+H_2S+CO+COS)/2SO_2 = 1$ is obtained — the components are given in volume percentages.

In the test series II-4 the increase of fuel compared with the previous test (II-3) was 13 kg/h of butane (or the total amount increased to 111.20 kg/h). The temperature of the gas measured in the uptake was 1250°C. In the test series II-5 the gases were taken from the uptake at the temperature of 1300°C corresponding to the catalysis ratio. The additional amounts of fuel and air required for the increase of the temperature of the gas phase were 12.59 kg/h of butane and respectively 151.2 $Nm^3$/h of combustion air.

The gas phase and heat balances corresponding to each test series are given in Appendixes II and III.

According to Table 2, by using a double catalysis the following percentages of the sulphur fed into the gas phase in the reduction tests of the test series could be recovered in the form of elemental sulphur:

II-2 about 28.6; II-3 about 60.1; and II-4 about 93.9.

By using the most simple separation method, that is, condensation, the obtained amounts — weight-% — of elemental sulphur corresponding a temperature of 140°C are the following:

II-2 about 11.7; II-3 about 26.9; and II-4 about 44.4.

On an industrial scale these figures are somewhat higher because, depending on the cooling of the gases, gliding takes place in a direction increasing the amount of elemental sulphur, that, is catalytic direction. This can easily be seen from the results obtained in the double catalysis of the test series II-4.

A. Catalysis at a temperature of 400°C:

Volume of gas 1586 Nm³; $P_{O_2}=1.18\times10^{-26}$ and $P_{S_R}=2.42\times10^{-3}$ atm.

Analysis — vol-% —: 2.67 $H_2S$; 0.20 COS; 1.36 $SO_2$; 12.29 $CO_2$ and 83.65 $N_2$.

B. Catalysis at a temperature of 200°C:

Volume of gas 1577 Nm³; selective catalysis $$2H_2S_{(9)} + SO_{2\,(9)} \rightarrow 2H_2O_{(9)} + 3/8S_{8(9)}$$

Analysis — vol-% —: 0.24 $H_2S$; 0.02 COS; 0.14 $SO_2$; 12.75 $CO_2$ and 86.86 $N_2$.

However, condensation is advantageous in special cases only, for example, when the capacity limit of a $H_2SO_4$ manufacturer so demands. In most cases an additional burning must be carried out after the condensation in order to convert the $S_1$ compounds into corresponding oxides.

The test series was carried out in conditions exactly similar to those in example II-2.

The reduction butane was fed to the lower furnace at feeding point (e). The oxygen and sulphur pressures of the gas phase in the uptake at a temperature of 1250°C were $P_{O_2}=1.80\times10^{-9}$ atm and $P_{S_2}=3.64\times10^{-3}$ atm. The feeding amounts of butane and air were 84.5 kg/h and 1445 Nm³/h respectively.

The feeding amount of sulphides was 500 kg/h and the portion of flying dust in it was 16 weight-%.

The products of the test operation together with their analyses and the gas phase and heat balances are given in Appendixes I, II and III.

The circulating flying dust load did not notably change the distribution of the side components in the melt products. The amount of zinc only sligtly increased in the slag phase even though its feeding amount increased some 57 percent in comparison to example I-1 under the influence of the dusts.

A considerable advantage is gained by feeding sulphidized flying dust compared with oxidic dust, thanks to the greater fuel value of the former.

For example, in the test operation I-1 the fuel value of the flying dust was (at a temperature of 25°C and taking the oxidation degree of FeO, $Cu_2O$ and ZnO as a basis): H = + 32 Kcal/kg and that of sulphidized dust in the test operation III-1: H = -640.4 Kcal/kg. When boiler leaks and the like occur, oxidic dust (containing some sulphur) may also occur sulphated in which case the dissociation heat of the sulphates must naturally be supplied in the reaction shaft. Let us mention as an example the fuel values of dust obtained in production in cases of boiler leaks: oxidic dust (4.8% S; 2.4% $SiO_2$) Δ H = 49.8 Kcal/kg; sulphated dust (22.6% O) Δ H = 235.8 Kcal/kg; and partly sulphidized dust (23.1% S and 2.5% O) Δ H = -723.0 Kcal/kg. It is natural that oxidic and sulphated dust in circulation greatly disturbs the combustion reactions in the reaction shaft and increases the amount of additional fuel.

Table 2

| Sulphur balance component | Yield of elemental sulphur in test operations Example | | | |
|---|---|---|---|---|
| | II-1 | II-2 | II-3 | II-4 |
| Feeding of sulphur to the separation process: kg/h | 135.7 | 131.4 | 124.8 | 124.8 |
| Yield of sulphur from the catalytic circuit: kg/h | 38.0 | 37.6 | 75.0 | 117.2 |
| Yield of elemental sulphur from the feed: % | 28.0 | 28.6 | 60.1 | 93.9 |
| Amount of exhaust gases in a humid state: Nm³/h | 1533.3 | 1538.7 | 1553.0 | 1566.6 |
| Analysis of exhaust gases —vol-% — $SO_2+8S_R+COS+H_2S$ | 4.45 | 4.26 | 2.24 | 0/34 |
| Yield of elemental sulphur from the feed at a temperature of 140°C — % of the feed | 11.9 | 11.7 | 26.9 | 44.4 |

EXAMPLE III-1

Feeding of sulphidized flying dust back into the smelting system.

Appendix I
Amounts and analyses of products of flash smelting process test operations

| Component Example | Amount kg/h | Analysis — weight-% — | | | | | | | |
|---|---|---|---|---|---|---|---|---|---|
| | | Cu | Fe | Co | Ni | Zn | S | O | $SiO_2$ |
| Flying dust | | | | | | | | | |
| Example I-1 | 93.6 | 18.37 | 27.36 | 0.16 | 0.11 | 4.76 | 3.32 | (12.4) | 25.50 |
| Example II-1 | 99.8 | 17.23 | 25.66 | 0.15 | 0.11 | 4.47 | 18.29 | ( 2.7) | 23.91 |
| Example II-2 | 81.7 | 17.95 | 30.79 | 0.15 | 0.11 | 5.89 | 21.50 | ( 3.2) | 14.26 |
| Example II-4 | 85.8 | 17.10 | 29.34 | 0.15 | 0.10 | 5.61 | 28.23 | ( 0.0) | 13.59 |
| Example III-1 | 80.0 | 17.95 | 28.57 | 0.15 | 0.11 | 7.96 | 21.13 | ( 3.2) | 14.79 |
| Slag | | | | | | | | | |
| Example I-1 | 331.4 | 3.35 | 46.00 | 0.25 | 0.06 | 1.10 | 0.27 | | 27.43 |
| Example II-2 | 328.7 | 0.50 | 46.06 | 0.27 | 0.08 | 1.11 | 0.80 | | 28.76 |
| Example III-1 | 324.1 | 0.54 | 45.68 | 0.26 | 0.08 | 2.19 | 0.75 | | 28.53 |

Appendix I—Continued

Amounts and analyses of products of flash smelting process test operations

| Component Example | Amount kg/h | Analysis — weight-% — | | | | | | | |
|---|---|---|---|---|---|---|---|---|---|
| | | Cu | Fe | Co | Ni | Zn | S | O | $SiO_2$ |
| Matte | | | | | | | | | |
| Example I-1 | 82.7 | 76.60 | 2.50 | 0.06 | 0.21 | 0.24 | 19.55 | 0.28 | 0.15 |
| Example II-2 | 99.0 | 76.10 | 3.15 | 0.06 | 0.24 | 0.28 | 19.50 | 0.32 | 0.20 |
| Example III-1 | 96.6 | 77.40 | 2.15 | 0.05 | 0.25 | 0.21 | 19.49 | 0.21 | 0.15 |

Appendix II

Temperature of gas phase —°C —, volume —Nm³— oxygen and sulphur pressure — atm.

| Example Sampling point | T | V | $P_{O_2}$ | $P_{S_2}$ |
|---|---|---|---|---|
| I-1 Conventional smelting method | | | | |
| Shaft (g) | 1355 | 964.3 | $7.3 \times 10^{-8}$ | $3.82 \times 10^{-4}$ |
| Shaft (h) | 1310 | 965.0 | $1.19 \times 10^{-7}$ | $2.64 \times 10^{-5}$ |
| Rising tube (k) | 1300 | 1511.8 | $1.19 \times 10^{-7}$ | $1.07 \times 10^{-5}$ |
| II-1 Partial reduction in rising tube | | | | |
| Rising tube (k) | 1250 | 1553.8 | $1.82 \times 10^{-9}$ | $4.18 \times 10^{-3}$ |
| II-2 Partial reduction in lower furnace and rising tube | | | | |
| Rising tube (k) | 1250 | 1559.9 | $1.80 \times 10^{-9}$ | $3.99 \times 10^{-3}$ |
| II-3 Partial reduction in lower furnace and rising tube | | | | |
| Rising tube (k) | 1250 | 1588.9 | $9.08 \times 10^{-10}$ | $7.93 \times 10^{-3}$ |
| II-4 Complete reduction in rising tube | | | | |
| Rising tube (k) | 1250 | 1622.8 | $4.64 \times 10^{-10}$ | $1.25 \times 10^{-2}$ |
| II-5 Complete reduction in rising tube | | | | |
| Rising tube (k) | 1300 | 1789.3 | $1.39 \times 10^{-9}$ | $9.81 \times 10^{-3}$ |
| III-1 Circulating flying dust load | | | | |
| Rising tube (k) | 1250 | 1516.3 | $1.80 \times 10^{-9}$ | $3.64 \times 10^{-3}$ |

Gas phase of flash smelting process test operations
Feeding of materials to gas phase — kg/h —

| Example Sampling point | C | H | S | O | Zn | $N_2$ |
|---|---|---|---|---|---|---|
| I-1 Conventional smelting method | | | | | | |
| Shaft (g) | 19.2 | 4.7 | 150.8 | 233.9 | — | 964.6 |
| Shaft (h) | 19.2 | 4.7 | 150.8 | 236.8 | — | 964.6 |
| Rising tube (k) | 54.5 | 12.4 | 150.8 | 389.6 | — | 1458.8 |
| II-1 Partial reduction in rising tube (k) | 68.6 | 15.3 | 137.8 | 398.5 | 4.5 | 1458.8 |
| II-2 Partial reduction in lower furnace and rising tube | | | | | | |
| Rising tube (k) | 70.5 | 15.7 | 133.8 | 402.7 | 4.8 | 1458.8 |
| II-3 Partial reduction in lower furnace and rising tube | | | | | | |
| Rising tube (k) | 81.3 | 17.9 | 124.8 | 405.3 | 4.8 | 1458.8 |
| II-4 Complete reduction in rising tube | | | | | | |
| Rising tube (k) | 92.0 | 20.2 | 124.8 | 405.3 | 4.8 | 1458.8 |
| II-5 Complete reduction in rising tube | | | | | | |
| Rising tube (k) | 102.5 | 22.4 | 124.8 | 451.1 | 4.8 | 1607.0 |
| III-1 Circulating flying dust load | | | | | | |
| Rising tube (k) | 69.9 | 15.5 | 123.6 | 392.2 | 6.4 | 1416.0 |

Gas phase of flash smelting process test operations
Composition of gas phase — vol-% — — dry analysis —

| Example Sampling Point | $H_2$ | $H_2S$ | CO | COS | $CO_2$ | $SO_2$ | $N_2$ |
|---|---|---|---|---|---|---|---|
| I-1 Conventional smelting method | | | | | | | |
| Shaft (g) | 0.18 | 0.01 | 0.37 | — | 3.55 | 11.45 | 84.44 |
| Shaft (h) | 0.08 | — | 0.16 | — | 3.76 | 11.53 | 84.47 |
| Rising tube (k) | 0.14 | — | 0.30 | — | 7.10 | 7.66 | 84.80 |

Appendix II — Continued
Gas phase of flash smelting process test operations
Composition of gas phase — vol-% — dry analysis —

| Example Sampling Point | $H_2$ | $H_2S$ | CO | COS | $CO_2$ | $SO_2$ | $N_2$ |
|---|---|---|---|---|---|---|---|
| II-1 Partial reduction in rising tube Rising tube (k) | 0.69 | 0.15 | 1.31 | 0.01 | 7.90 | 5.84 | 84.10 |
| II-2 Partial reduction in lower furnace and rising tube Rising tube (k) | 0.71 | 0.15 | 1.35 | 0.01 | 8.11 | 5.67 | 84.00 |
| II-3 Partial reduction in lower furnace and rising tube Rising tube (k) | 1.10 | 0.33 | 2.06 | 0.03 | 8.79 | 4.09 | 83.60 |
| II-4 Complete reduction in rising tube Rising tube (k) | 1.64 | 0.62 | 2.99 | 0.05 | 9.15 | 2.65 | 82.90 |
| II-5 Complete reduction in rising tube Rising tube (k) | 1.79 | 0.48 | 3.40 | 0.04 | 8.85 | 2.83 | 82.61 |
| III-1 Circulating flying dust load Rising tube (k) | 0.73 | 0.15 | 1.38 | 0.01 | 8.29 | 5.43 | 84.01 |

Appendix III
Heat balances of flash smelting process test operations

| | I Conventional smelting method | | | II-1 Reduction in rising tube | | |
|---|---|---|---|---|---|---|
| Example Balance Component | Temperature °C | Amount of material kg-Nm³/h | Amount of heat Mcal/h | Temperature °C | Amount of material kg-Nm³/h | Amount of heat Mcal/h |
| In | | | | | | |
| Cu concentrate | 25 | 503.0 | 497.5 | 25 | 503.0 | 497.5 |
| Sand | 25 | 89.6 | — | 25 | 89.6 | — |
| Butane | 25 | 65.9 | 719.6 | 25 | 82.8 | 904.5 |
| — reaction shaft | 500 | 984.2 | 150.9 | 500 | 984.2 | 150.9 |
| — lower furnace | 25 | 504.3 | — | 25 | 504.3 | — |
| In total | | | 1368.0 | | | 1552.9 |
| Out | | | | | | |
| Matte | 1275 | 82.7 | 63.4 | 1275 | 82.7 | 63.4 |
| Slag | 1310 | 331.4 | 101.6 | 1310 | 331.4 | 101.6 |
| Flying dust | 1300 | 93.6 | 22.5 | 1250 | 99.8 | 85.6 |
| Gas phase | 1300 | 1511.8 | 747.8 | 1250 | 1553.8 | 864.2 |
| Losses of heat | | | 435.0 | | | 435.0 |
| Out total | | | 1370.3 | | | 1549.8 |
| Difference: In — Out | | | −2.3 | | | +3.1 |

Heat balances of flash smelting process test operations

| | II-2 Reduction in lower furnace and rising tube | | | II-3 Reduction in lower furnace and rising tube | | |
|---|---|---|---|---|---|---|
| Example Balance component | Temperature °C | Amount of material kg-Nm³/h | Amount of heat Mcal/h | Temperature °C | Amount of material kg-Nm³/h | Amount of heat Mcal/h |
| In | | | | | | |
| Cu concentrate | 25 | 503.0 | 497.5 | 25 | 503.0 | 497.5 |
| Sand | 25 | 79.9 | — | 25 | 79.9 | — |
| Butane | 25 | 85.2 | 930.3 | 25 | 98.2 | 1072.3 |
| Air | | | | | | |
| — reaction shaft | 500 | | 150.9 | 500 | 984.2 | 150.9 |
| — lower furnace | 25 | | — | 25 | 504.3 | — |
| In total | | | 1578.7 | | | 1720.7 |
| Out | | | | | | |
| Matte | 1275 | 99.0 | 77.9 | 1275 | 99.0 | 77.9 |
| Slag | 1300 | 328.7 | 117.3 | 1300 | 328.7 | 117.3 |
| Flying dust | 1250 | 81.7 | 78.2 | 1250 | 85.8 | 96.9 |
| Gas phase | 1250 | 1559.9 | 868.1 | 1250 | 1588.9 | 988.1 |
| Losses of heat | | | 435.0 | | | 435.0 |
| Out total | | | 1576.5 | | | 1715.2 |
| Difference: In — Out | | | +2.2 | | | +5.5 |

Heat balances of flash smelting process test operations

| | II-4 Complete (gas) reduction | | | II-5 Complete (gas) reduction | | |
|---|---|---|---|---|---|---|
| Example Balance component | Temperature °C | Amount of material kg-Nm³/h | Amount of heat Mcal/h | Temperature °C | Amount of material kg-Nm³/h | Amount of heat Mcal/h |
| In | | | | | | |
| Cu concentrate | 25 | 503.0 | 497.5 | 25 | 503.0 | 497.5 |
| Sand | 25 | 79.9 | — | 25 | 79.9 | — |

Appendix III—Continued

Heat balances of flash smelting process test operations

| Example Balance component | II-4 Complete (gas) reduction | | | II-5 Complete (gas) reduction | | |
|---|---|---|---|---|---|---|
| | Temperature °C | Amount of material kg-Nm³/h | Amount of heat Mcal/h | Temperature °C | Amount of material kg-Nm³/h | Amount of heat Mcal/h |
| Butane | 25 | 111.2 | 1214.3 | 25 | 123.8 | 1351.8 |
| Air | | | | | | |
| — reaction shaft | 500 | 984.2 | 150.9 | 500 | 984.2 | 150.9 |
| — lower furnace | 25 | 504.3 | — | 25 | 655.5 | — |
| In total | | | 1862.8 | | | 2000.2 |
| Out | | | | | | |
| Matte | 1275 | 99.9 | 77.9 | 1275 | 99.0 | 77.9 |
| Slag | 1300 | 328.7 | 117.3 | 1310 | 328.7 | 118.1 |
| Flying dust | 1250 | 85.8 | 96.8 | 1300 | 85.8 | 97.6 |
| Gas phase | 1250 | 1622.8 | 1145.3 | 1300 | 1789.3 | 1274.2 |
| Losses of heat | | | 435.0 | | | 435.0 |
| Out total | | | 1872.3 | | | 2002.8 |
| Difference: In — Out | | | −9.5 | | | −2.6 |

Heat balances of flash smelting process test operations
III Circulating flying dust load

| Example Balance Component | Temperature °C | Amount of material kg-Nm³/h | Amount of heat Mcal/h |
|---|---|---|---|
| In | | | |
| Cu Concentrate | 25 | 500.0 | 466.7 |
| Sand | 25 | 71.0 | — |
| Butane | 25 | 84.5 | 922.7 |
| Air | | | |
| — reaction shaft | 500 | | 150.9 |
| — lower shaft | 25 | | |
| In total | | | 1540.3 |
| Out | | | |
| Matte | 1275 | 96.6 | 74.4 |
| Slag | 1300 | 324.0 | 114.1 |
| Flying dust | 1250 | 80.0, 74.3 | |
| Gas phase | 1250 | 1516.3 | 839.0 |
| Losses of heat | | | 435.0 |
| Out total | | | 1536.8 |
| Difference: In — Out | | | +3.5 |

We claim:

1. An improved method of flash smelting sulphide ores in a furnace, in which a fine-grained concentrate is suspended into a heated downward flow of an oxygen containing gas at a temperature of from 1200°C to about 1400°C in a vertical reaction shaft to oxidize the non-oxidic metal compounds in the concentrate and separate the gases and the flue dust from the solids, which solids form a matte and a slag thereon, and including increasing the ratio of the partial pressure of sulphur to the partial pressure of oxygen in the gases obtained from the oxidizing smelting in the vertical reaction shaft sufficiently to convert the metal oxides of the flue dust into corresponding metal sulphides and to retain the major part of the iron contained in the slag in a bivalent state, and then leading the gases off through the uptake shaft, the gases having been so reduced that ratio by volume $(H_2 + H_2S + CO + COS)/2SO_2$ is less than or approximately equal to 1 in the uptake tube.

2. An improved method as recited in claim 1, in which a fuel is dispersed into the gases emerging from the reaction shaft to decrease the partial pressure of the oxygen and reduce so much sulphur dioxide to sulphur that the partial pressure of the sulphur is at least as high as the dissociation pressure of the sulphur in the sulphur compounds of metals.

3. An improved method as recited in claim 1, in which the gases emerging from the reaction shaft are reduced to such an extent that the oxidic non-ferrous metal compounds contained in the slag are reduced into corresponding metals and metal sulphides.

4. An improved method as recited in claim 1, in which the gases emerging from the reaction shaft are reduced to such an extent that the oxidation of the ferrous oxide in the slag is prevented, formed $Fe_3O_4$ is reduced and the iron retains bivalent.

5. An improved method as recited in claim 1, in which the flying dust is separated from the gases after the furnace and used as fuel in flash smelting.

6. An improved method as recited in claim 1, in which the components of the flue dust are separated from each other by flotation.

7. An improved method as recited in claim 1, in which the gases emerging from the reaction shaft are reduced to such an extent that at least a part of the sulphur content of the gases is recovered in the form of elemental sulphur.

8. An improved method as recited in claim 1, in which the reduction of the gases emerging from the reaction shaft is regulated to adjust the $SO_2$ content in the exhaust gases.

9. An improved method as recited in claim 1, in which the smelting in the reaction shaft is carried out in a strongly oxidizing manner so that a matte rich in metal is obtained and the reduction of the oxygen containing emerging from the reaction shaft is then carried out to such an extent that losses of metal from the matte into the slag are prevented from growing greater than with conventional metal contents in the matte, and thus the slag to be blown in a converter is decreased.

* * * * *